United States Patent
Haddad

(10) Patent No.: US 6,963,612 B2
(45) Date of Patent: Nov. 8, 2005

(54) SYSTEM FOR DETECTING START CODES IN MPEG VIDEO STREAMS AND METHOD OF OPERATING THE SAME

(75) Inventor: Semir S. Haddad, San Jose, CA (US)

(73) Assignee: STMicroelectronic, Inc., Carrollton, TX (US)

( * ) Notice: Subject to any disclaimer, the term of this patent is extended or adjusted under 35 U.S.C. 154(b) by 668 days.

(21) Appl. No.: 09/944,729

(22) Filed: Aug. 31, 2001

(65) Prior Publication Data

US 2003/0043919 A1 Mar. 6, 2003

(51) Int. Cl.[7] ................................................. H04N 7/12

(52) U.S. Cl. ................................................. 375/240.25

(58) Field of Search ...................... 375/240.01, 240.25, 375/240.26, 240.28; H04N 7/12

(56) References Cited

U.S. PATENT DOCUMENTS 5,726,989 A * 3/1998 Dokic ................... 375/240.01

* cited by examiner

*Primary Examiner*—Young Lee
(74) *Attorney, Agent, or Firm*—Lisa K. Jorgenson; William A. Munck

(57) ABSTRACT

An exemplary MPEG decoder is capable of decoding received bitstreams and generating PES packets. The MPEG decoder includes a controller that detects start codes in the received bitstreams, each of such codes having a three-byte start code prefix and a one-byte start code value. The controller is operable to (i) fetch a thirty-two bit word of a received bitstream, (ii) determine whether a start code prefix and a start code value are properly aligned within the thirty-two bit word, and (iii) if not properly aligned within the thirty-two bit word, determine that the thirty-two bit word does not contain any portion of the start code prefix based solely on a determination that a least significant byte of the thirty-two bit word is not part of the start code prefix.

20 Claims, 6 Drawing Sheets

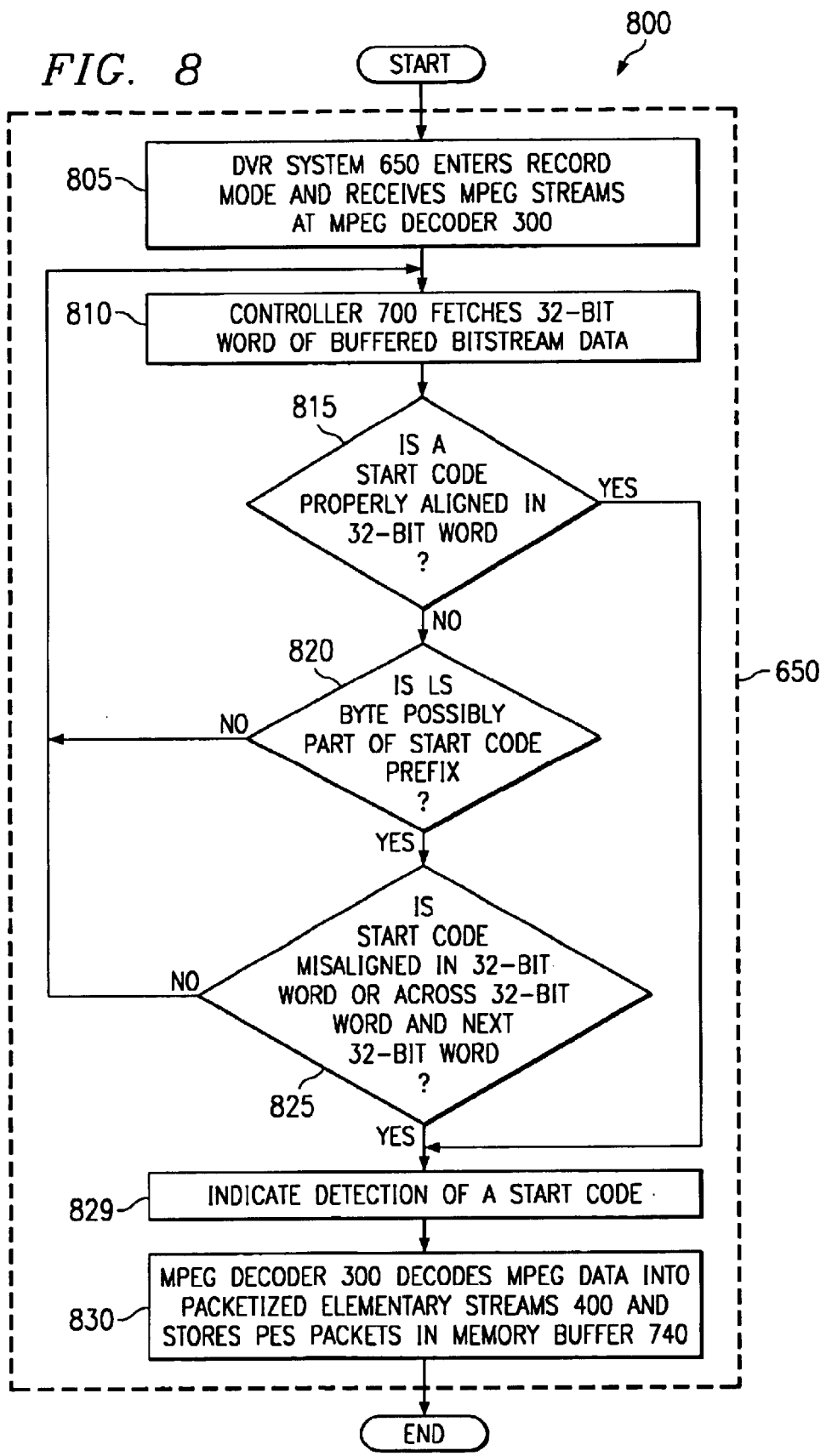

US 6,963,612 B2

SYSTEM FOR DETECTING START CODES IN MPEG VIDEO STREAMS AND METHOD OF OPERATING THE SAME

CROSS-REFERENCE TO RELATED APPLICATIONS

The present invention is related to those disclosed in the following U.S. Patent Applications:

1. Ser. No. 09/943,837, filed concurrently herewith, entitled "SYSTEM FOR MULTIPLEXING VIDEO DATA STREAMS IN A DIGITAL VIDEO RECORDER AND METHOD OF OPERATING THE SAME";
2. Ser. No. 09/943,815, filed concurrently herewith, entitled "APPARATUS AND METHOD FOR INDEXING MPEG VIDEO DATA TO PERFORM SPECIAL MODE PLAYBACK IN A DIGITAL VIDEO RECORDER";
3. Ser. No. 09/943,791, filed concurrently herewith, entitled "DIGITAL VIDEO RECORDER USING CIRCULAR FILE MANAGEMENT AND METHOD OF OPERATION"; and
4. Ser. No. 09/943,793, filed concurrently herewith, entitled "APPARATUS AND METHOD FOR SYNCHRONIZING VIDEO AND AUDIO MPEG STREAMS IN A VIDEO PLAYBACK DEVICE".

The above applications are commonly assigned to the assignee of the present invention. The disclosures of these related patent applications are hereby incorporated by reference for all purposes as if fully set forth herein.

A portion of the disclosure of this patent document contains material that is subject to copyright protection. The copyright owner has no objection to the facsimile reproduction by anyone of this patent document or the patent disclosure, as it appears in the United States Patent and Trademark Office patent file or records, but otherwise reserves all copyright rights whatsoever.

TECHNICAL FIELD OF THE INVENTION

The present invention is generally directed to digital video playback device and, more specifically, to a system for detecting start codes in MPEG video streams in a digital video recorder (DVR) and method of operating the same.

BACKGROUND OF THE INVENTION

Digital video recorder (DVR) systems are becoming increasingly popular with consumers. Digital video recorder systems use magnetic hard disk drives rather than magnetic cassette tapes to store video programs. For example, the ReplayTV™ recorder and the TiVO™ recorder record television programs in digital formats on hard disk drives using, for example, MPEG-2 compression. Also, some DVR systems may record on a readable/writable digital versatile disk (DVD) rather than a magnetic disk.

MPEG-2 compression is essential for storing a recorded television program. An uncompressed video program would require an enormous (and impractical) amount of storage space on a disk drive. Similarly, multimedia systems require an enormous amount of bandwidth to provide services such as video-on-demand, videoconferencing, and the like. However, the inherent limitations on network bandwidth are a primary inhibitor to the performance of such systems.

Therefore, compression and communication standards have been developed to overcome the bandwidth limitations of conventional communication networks. These standards define the compression of video and audio data and the delivery of control data in a single bit stream transmitted in a frequency band that would before only accommodate an analog program.

Moving Picture Experts Group (MPEG) is a family of audio and video compression standards. In the MPEG-2 standard, video compression is defined both within a given video frame (i.e., spatial compression) and between frames (i.e., temporal compression). Spatial compression is accomplished by conversion of a digital image from the time domain to the frequency domain by a discrete cosine transform, quantization, variable length coding, and Huffman coding. Temporal compression is accomplished via a process referred to as motion compensation in which a motion vector is used to describe the translation of picture elements between pictures (or frames).

ISO 13818-1 is the transport layer portion of the MPEG-2 standard, and specifies: i) packetization of audio and video elementary bit streams into packetized elementary streams (PESs), and ii) combination of audio and video PESs into a single time division or packet multiplexed bit stream for transmission and subsequent de-multiplexing into multiple bit streams for decompression and display. The single time division or packet multiplexed bit stream is as shown from various conceptual perspectives in FIGS. 1 to 5.

FIG. 1 illustrates a conceptual block diagram (generally designated 100) of the packetization of audio and video elementary bit streams and packet multiplexing according to an exemplary embodiment of the prior art. Distinct elementary streams are formed in audio encoder 105, video encoder 110, auxiliary (or other data) source 115, and systems data source 120. Each of these elementary streams is packetized into a packetized elementary stream (PES). The packetized elementary streams of audio data, video data, and the packets of other data and systems data are packet multiplexed by a MPEG-2 multiplexor into an MPEG-2 system stream.

FIG. 2 illustrates a conceptual block diagram of an exemplary time-division or packet-multiplexed bit stream (generally designated 200) according to an exemplary embodiment of the prior art. Bit stream 200 comprises a transport packet stream, wherein each packet illustratively comprises packet header 205 and payload 210 (i.e., packet data bytes) and, according to FIG. 2, optional adaptation field 215. An MPEG-2 bit stream comprises two layers, namely, a system layer (also referred to as an outer layer, a control layer, or the like) and a compression layer (also referred to as an inner layer, a payload layer, a data layer, or the like).

The MPEG-2 system layer facilitates (i) multiplexing one or more programs made up of related audio and video bit streams into a single bit stream for transmission through a transmission medium, and (ii) de-multiplexing of the single bit stream into separate audio and video program bit streams for decompression while maintaining synchronization. The system layer defines data stream syntax for timing control and synchronization and interleaving of the video and audio bit streams. The system layer is capable of: i) video and audio synchronization, ii) stream multiplexing, iii) packet and stream identification, iv) error detection, v) buffer management, vi) random access and program insertion, vii) private data, viii) conditional access, and ix) interoperability with other networks, such as those using asynchronous transfer mode (ATM). The MPEG-2 compression layer comprises the coded video and audio data streams. The system layer provides control data for multiplexing and de-multiplexing interleaved compression layers and, in doing so, defines those functions necessary for combining the compressed data streams.

FIG. 3 illustrates a conceptual block diagram of an MPEG-2-compliant decoding system (generally designated 300) according to an exemplary embodiment of the prior art. The components of decoding system 300 are well known to the skilled in the art and are therefore introduced for illustrative purposes only. Discussion of the functionality of these components will therefore be limited.

Decoding system 300 receives bit stream 200 as an input to system decoder 305. System decoder 305 de-multiplexes the system layer data of bit stream 200 into the compressed audio layer, the compressed video layer, and control data. The exemplary compressed audio layer data and video layer data are transferred to audio data buffer 310a and video data buffer 310v, respectively. The audio layer data is subsequently processed in audio decoder control block 315a and audio decoder 320a. The video layer data is subsequently processed in video decoder control block 315v and video decoder 320v. Exemplary control data is shown as program clock recovery (PCR) data, enable data, and startup values.

The MPEG-2 system layer supports a plurality of functions, namely, i) packet multiplexing and de-multiplexing of multiplexed multiple bit streams, ii) synchronous display of multiple coded bit streams, iii) buffer management and control, iv) time recovery and identification, v) random access, vi) program insertion, vii) conditional access, and viii) error tracking.

The MPEG-2 standard specifies two types of layer coding, namely, a program stream (PS) layer coding for relatively loss-less environments (e.g., CD-ROMS, DVDs, etc) and transport stream (TS) layer coding for lossy environments (e.g., cable television, satellite television, or other broadcast environments). Referring back to FIG. 2, bit stream 200 is illustratively a transport stream (TS) consisting of a plurality of TS packets divided into a packet header, an optional adaptation field, and the associated packet data (or payload). By contrast FIG. 4 illustrates a conceptual block diagram of a PES (generally designated 400) according to an exemplary embodiment of the prior art.

Packetized elementary stream (PES) 400 comprises packet header 405, optional PES header 410, and associated packet data 415. Packet header 405 comprises packet start code prefix 420, stream identifier (ID) 425, and PES packet length indicator 430. In accord herewith, all of the fields after PES packet length indicator 430 are optional. PES header 410 includes a presentation time stamp (PTS) field, a decoding time stamp (DTS) field, an elementary stream clock reference (ESCR) field, a elementary stream (ES) rate field, a DSM trick mode field, a copy information field, a prior PES clock recovery field, an extension field, and stuffing bytes.

Packet start code prefix 420 provides packet synchronization. Stream ID 425 provides packet identification and payload identification. PTS/DTS flag fields 435 and PTS/DTS fields 440 provide presentation synchronization. Data transfer is provided through the packet/header length 445, payload 415, and stuffing fields 450. Scramble control field 455 facilitates payload de-scrambling.

FIG. 5 illustrates a conceptual block diagram of an alternate time-division or packet-multiplexed bit stream (generally designated 200) according to an exemplary embodiment of the prior art. Bit stream 200 comprises access units 500, PES packets 400, and a plurality of TS packets 505. Bit stream 200 illustrates a layering relationship among access units 500, PES packets 400, and TS packets 505.

The TS layer operates to combine programs made up of PES-coded data with one or more independent time bases into a single stream. In accord with MPEG-2, a specific program does not require a unique time base, but if it does have a unique time base, the time base is the same for all of the elements of that program.

The PES layer is an inner layer portion of the MPEG-2 time division or packet multiplexed stream upon which the transport or program streams are logically constructed. The PES layer provides stream specific operations and supports the following: i) a common base of conversion between program and transport streams, ii) time stamps for video and audio synchronization and associated timing, especially for associated audio and video packets making up a broadcast channel, presentation, or program (collectively hereafter Programs), and having a common time base, iii) stream identification for stream multiplexing and de-multiplexing, and iv) such services as scrambling, VCR functions, and private data.

FIG. 5 further illustrates that, in accord with MPEG-2, each video or audio elementary stream (ES) is PES-packetized before insertion into a transport stream (TS). Elementary streams are continuous and PES packets containing an ES are generally of fixed lengths. Typically, video PES packets are on the order of tens of thousands of bytes and audio PES packets are on the order of thousands of bytes. However, video PES packets can also be specified as of undefined length. ES data, that is, access units 500, are first encapsulated into PES packets, which are, in turn, inserted into TS packets.

A transport stream may contain one or more independent, individual programs, such as individual broadcast television programs, whereby each individual program may have its own time base, and each stream comprises an individual program having its own packet identification (PID). Each separate individual program has one or more elementary streams generally having a common time base. While not illustrated in the PRIOR ART figures, different transport streams may be combined into a single system TS.

At the transport layer, the transport sync byte provides packet synchronization. The PID field data provides packet identification, de-multiplexing and sequence integrity data. The PID field is operable to collect the packets of a stream and reconstruct the stream. Continuity counters and error indicators provide packet sequence integrity and error detection. The payload unit start indicator and adaptation control are used for payload 1W synchronization, while the discontinuity indicator and program clock reference (PCR) fields are used for playback synchronization. The transport scramble control field facilitates payload de-scrambling. Private data transfer is accomplished through the private data flag and private data bytes. The data bytes are used for private payload data transfer, and the stuffing bytes are used to round out a packet.

A transport stream is a collection of transport stream packets linked by standard tables. These tables carry program specific information (PSI) and are built when a TS is created at the multiplexor. These tables completely define the content of the stream. Two of the tables of the TS are the program association table (PAT) and the program map table (PMT). The PAT operates as a table of contents for the TS that contains a unique identifier for the stream, a version number enabling dynamic changes of the PAT and the TS, and an association table of pairs of values. The pairs of values, PN, and PMT-PID, are the program number (PN) and the PID of the tables containing the program.

The PMT, on the other hand, describes all streams comprising a program. Each entry in the PMT is related to one program. The PMT provides a mapping between packets and programs, and contains a program number that identifies the program within the stream, a descriptor to carry private information about the program, the PID of the packets that contain the synchronization information, a number of pairs of values (e.g., stream type (ST), Data-PID) which, for each stream, specify the ST and the PID of the packets containing the data of that stream or program (Data-PID).

Collectively, these tables are used to process a particular program. At any point in time, each program has a unique PID in the PMT, which provides the PIDs for the selected program's audio, video, and control streams. The streams with the selected PIDs are extracted and delivered to the appropriate buffers and decoders for reconstruction and decoding.

Achieving and maintaining clock recovery and synchronization is a problem, especially with audio and video bit streams. In accord with the MPEG-2 standard, an end-to-end constant delay timing model digital image and audio data take the same amount of time to pass through the system from encoder to decoder. The system layer contains timing information that requires constant delay. The clock references are program clock reference (PCR) and the time stamps are the PTS and DTS.

Synchronization is accomplished using the program clock reference (PCR) data field in the TS adaptation field. PCR is typically a 42-bit field that is coded in two parts, a PCR base having a 33-bit value in units of 90 kHz, and a PCR extension having a 9-bit extension in units of 27 MHz, where 27 MHz is the system clock frequency. As a general rule, the first 33 bits of the first PCR received by the decoder initialize the counter in a clock generation, and subsequent PCR values are compared to clock values for fine adjustment. The difference between the PCR and the local clock can be used to drive a voltage-controlled oscillator, or a similar device or function, for example, to speed up or slow down the local clock.

Audio and video synchronization is typically accomplished through the presentation time stamp inserted in the PES header. The presentation time stamp is a 33-bit value in units of 90 kHz, where 90 kHz is the 27 MHZ system clock divided by 300. The presentation time stamp value indicates the time that the presentation unit should be presented to the user.

In digital video systems (e.g., MPEG-2 compliant digital video systems and HDTV compliant digital video systems), the transport layer is used to carry audio data, video data, and system data streams, in packets, to the individual decoders and system memory. The individual streams are multiplexed together with a set of buffer assumptions as defined in the MPEG-2 System Layer specification.

The popularity of digital video recorder (DVR) systems is due in part to enabling sophisticated time-shifted viewing, as well as to the ability of such systems to perform special play modes (also called "trick modes" or "trick plays"). Special play modes may include, among others "Fast Forward," "Slow Forward," "Normal Reverse," "Slow Reverse," "Fast Reverse," and the like. Special play modes are easier to perform if the DVR system knows the structure of the video stream and can jump directly to the video frames of interest.

To summarize, the MPEG standard provides an international standard for the compression and communication of motion video pictures and synchronized audio. When MPEG signals, compressed as above-described, are decoded, start codes are used. Because compressed data is of hierarchical construction, a start code corresponding to each hierarchy is placed at the start of each hierarchy.

Start codes are specific bit patterns that do not otherwise occur in the compressed data stream. Start codes consist of (i) a start code prefix that is followed by (ii) a start code value. The start code prefix is a string of twenty-three bits with the value zero ("0") followed by a single bit with the value one ("1"). The start code prefix is thus the bit string "0000 0000 0000 0000 0000 0001". The start code value is an eight bit integer that identifies the type of start code.

Start codes are byte aligned and operate to mark the "beginning" of each section, enabling the DVR system to identify and process the header that follows the start code. An exemplary PRIOR ART start code detection algorithm determines, every time a new thirty-two bit word is read, whether a 24-bit start code is embedded therein. The algorithm operates as follows:

Fetch a thirty-two bit word of the MPEG stream;
    Check the 24 most significant bits to check if the start code "000001xx" is present (first test);
    If not, check if it is xx000001 (second test);
    If not, check if it is xxxx0000 and the next thirty-two bit word is 01xxxxxx (third and fourth tests); and
    If not, check if it is xxxxxx00 and the next thirty-two bit word is 0001xxxx (fifth and sixth tests).

The foregoing approach processes each thirty-two bit word using six tests to detect a start code—a relatively high processing expense. Because start codes are relatively rare in an MPEG stream, there is a need in the art to reduce the processing resources expended. To accomplish this, an improved scheme for decoding MPEG streams is needed that implements improved systems and related methods that reduce non-start code word processing to improve MPEG decoder efficiency.

SUMMARY OF THE INVENTION

To address the above-discussed deficiencies of the prior art, it is a primary object of the present invention to provide systems and related methods to decode received bitstreams for processing in a digital video recorder (DVR) to generate program streams for temporary storage and later playback. A primary object hereof is to provide an efficient means by which to detect embedded start codes within the bitstreams received in the DVR. Because start codes are relatively infrequently received, it is desirable for the processing resources used in attempting to detect the same be minimized.

According to one advantageous embodiment, the system is embodied in a controller that is associated with a MPEG decoder of the DVR. The controller operates to detect start codes in the bitstreams received at the MPEG decoder, any such start code having a three-byte start code prefix and a one-byte start code value. The exemplary controller is operable to (i) sequentially fetch thirty-two bit words of a received bitstream, (ii) determine whether a start code prefix and a start code value are properly aligned within any such thirty-two bit word, and (iii) then, if not properly aligned within the thirty-two bit word, determine whether the least significant byte of each thirty-two bit word may be part of the start code prefix.

According to one related embodiment, the controller is further operable, if the least significant byte is not part of the start code prefix (i.e., the start code is not part of this thirty-two bit word), to fetch another thirty-two bit word of a buffered bitstream.

According to another related embodiment, the controller is further operable, if the least significant byte may be part of the start code prefix, to determine whether the start code prefix is (a) within the three least significant bytes of the thirty-two bit word, or (b) within the most significant byte of a next thirty-two bit word (i.e., meaning that a start code may have been misaligned and possibly spans two thirty-two bit words). The controller is therefore operable in conjunction with the second part of this element to fetch the next thirty-two bit word of the particular received bitstream.

According to yet another related embodiment, the controller is further operable, if the start code prefix may be within the next thirty-two bit word, to determine whether part of the start code prefix is (a) within the two least significant bytes of the thirty-two bit word and the most significant byte of the next thirty-two bit word, or (b) within the least significant byte of the thirty-two bit word and the two most significant bytes of the next thirty-two bit word.

According to yet another related embodiment, the controller is further operable, if the start code prefix is not part of this thirty-two bit word, to process the next thirty-two bit word to detect whether a start code is embedded therein, whether in total (i.e., aligned) or in part (i.e., misaligned, possibly spanning two thirty-two bit words, as described hereinabove).

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. In particular, a controller may comprise a data processor and an associated memory that stores instructions that may be executed by the data processor. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which:

FIG. 8 illustrates a flow diagram of an exemplary method of detecting start codes in bitstreams received and buffered in an MPEG decoder according to one embodiment of the present invention.

DETAILED DESCRIPTION OF THE INVENTION

FIGS. 1 through 8, discussed below, and the various embodiments used to describe the principles of the present invention in this patent document are by way of illustration only and should not be construed in any way so as to limit the scope of the invention. Those skilled in the art will understand that the principles of the present invention may be implemented in any suitably arranged digital video recorder (DVR) system.

Figure 1:
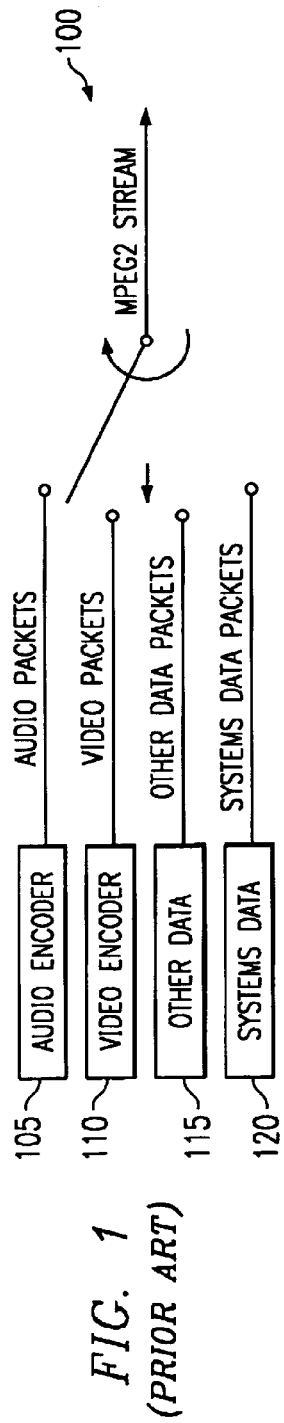
FIG. 1 illustrates a conceptual block diagram of the packetization of audio and video elementary bit streams and packet multiplexing according to an exemplary embodiment of the prior art.
Figure 3:
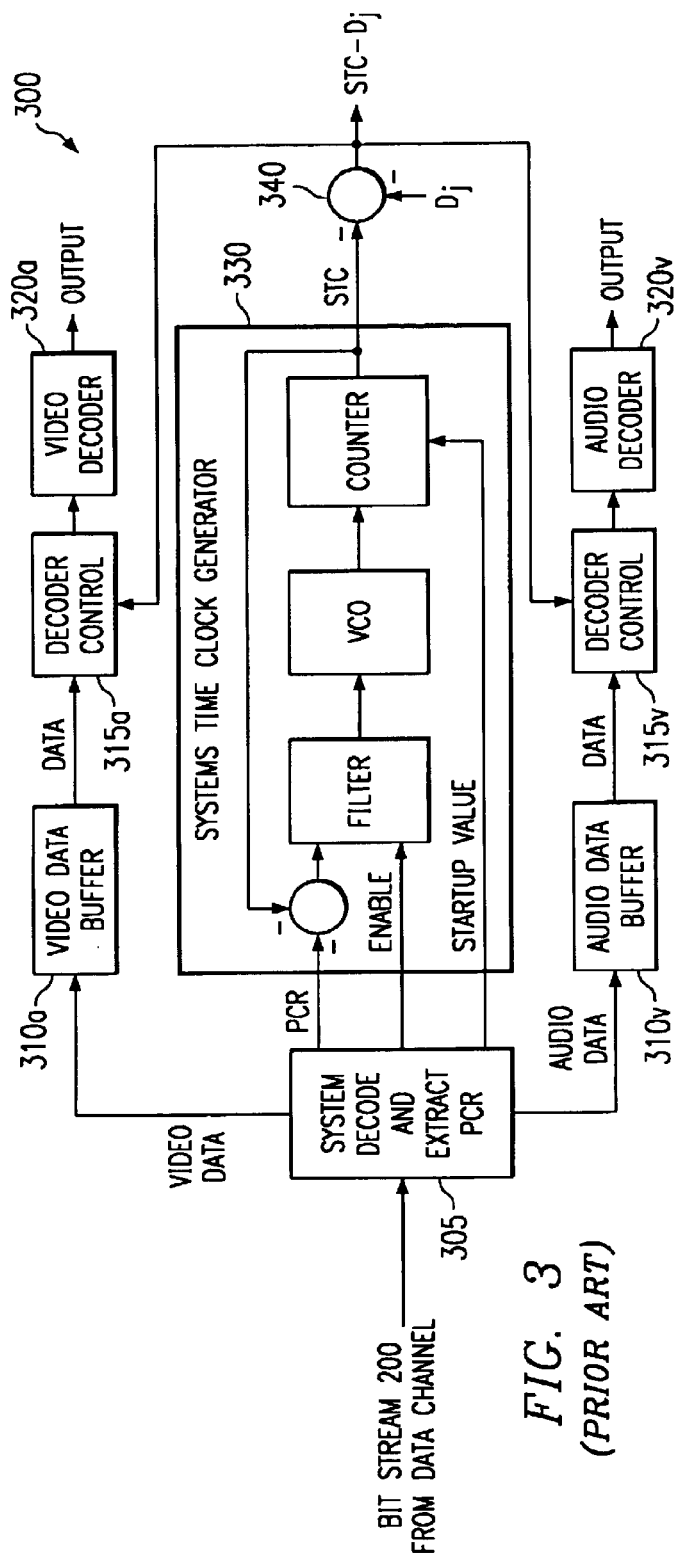
FIG. 3 illustrates a conceptual block diagram of an MPEG-2-compliant decoding system according to an exemplary embodiment of the prior art.
Figure 2:
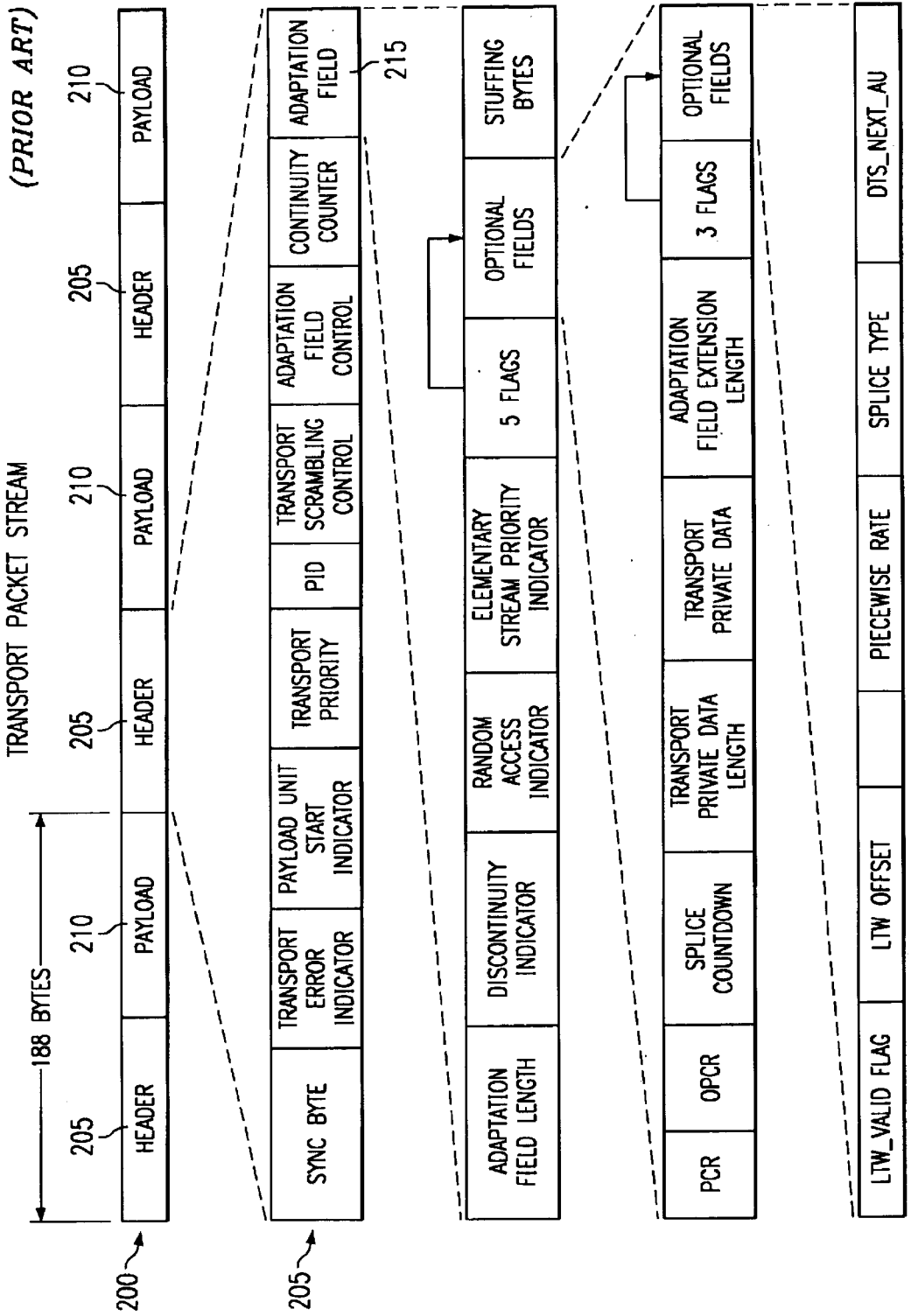
FIG. 2 illustrates a conceptual block diagram of an exemplary time-division or packet-multiplexed bit stream according to an exemplary embodiment of the prior art.
Figure 4:
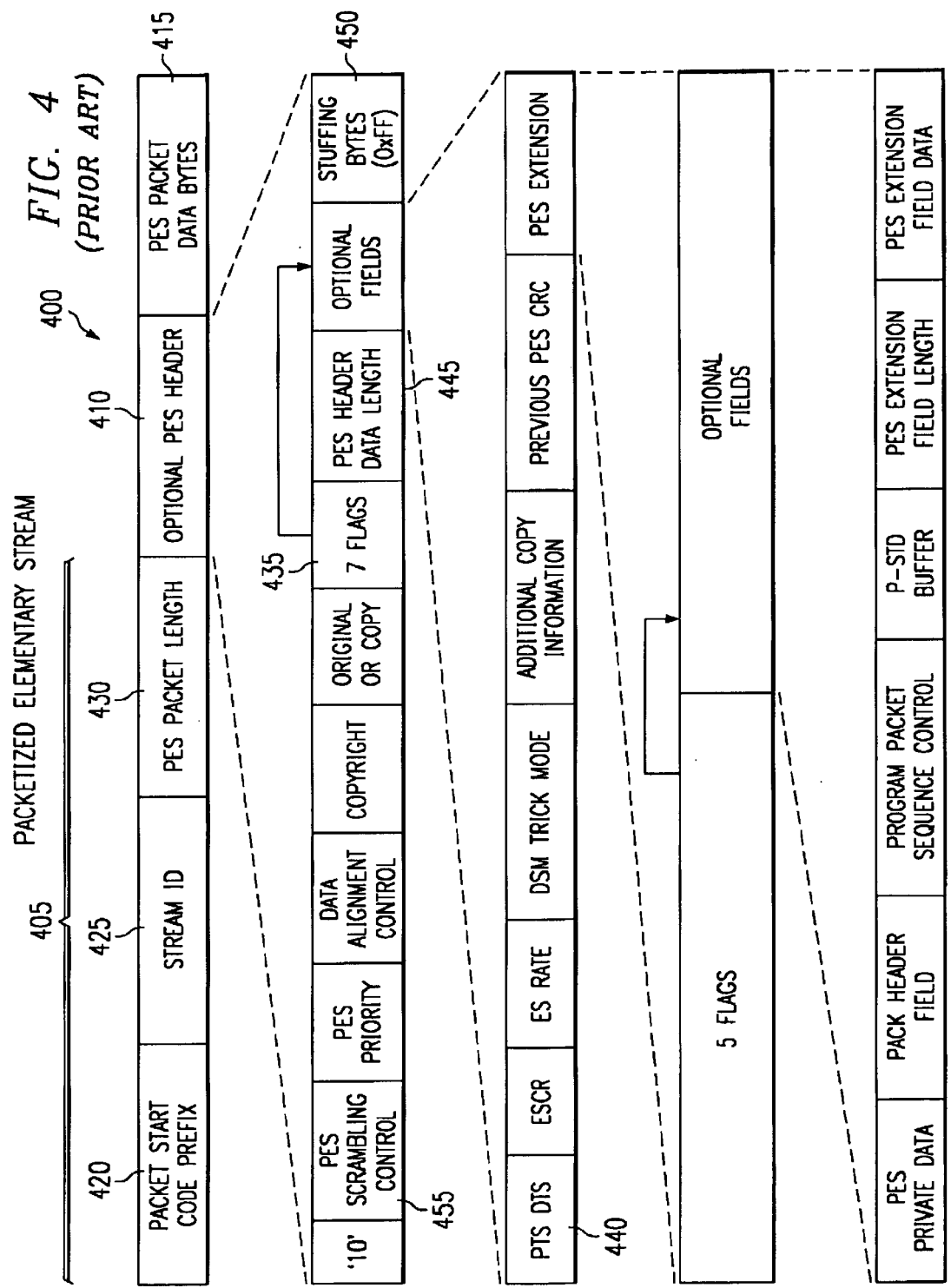
FIG. 4 illustrates a conceptual block diagram of a PES according to an exemplary embodiment of the prior art.
Figure 5:
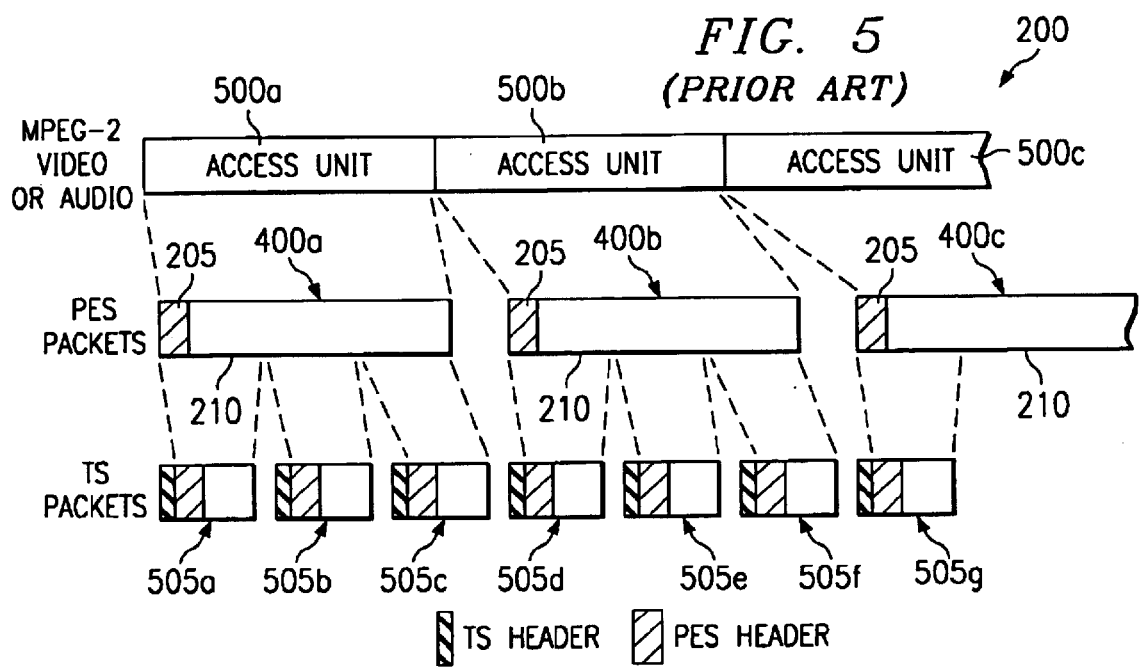
FIG. 5 illustrates a conceptual block diagram of an alternate time-division or packet-multiplexed bit stream according to an exemplary embodiment of the prior art.
Figure 6:
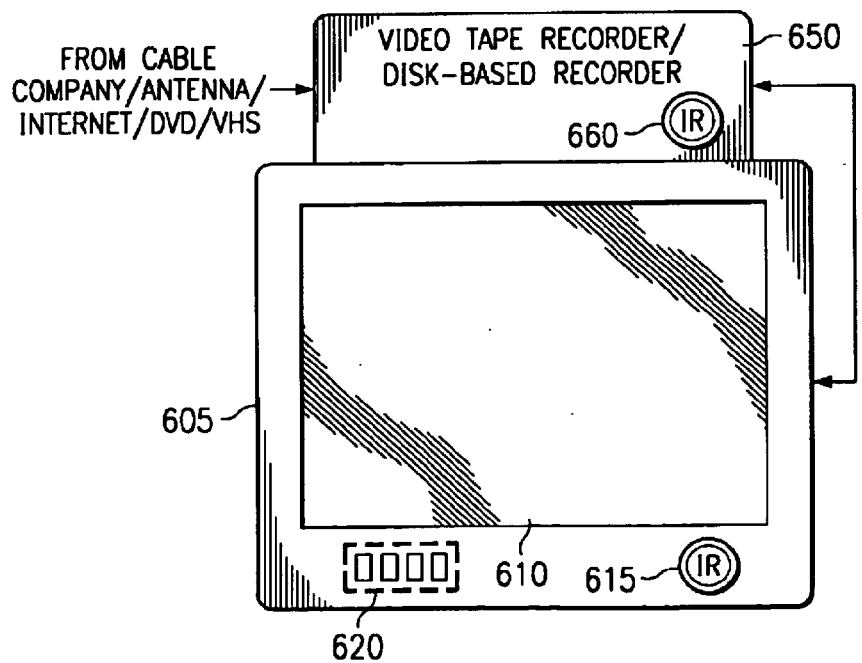
FIG. 6 illustrates an exemplary digital video recorder (DVR) system and an associated television according to one embodiment of the present invention.

FIG. 6 illustrates exemplary digital video recorder (DVR) system 650 and television 605 according to one embodiment of the present invention. Digital video recorder system 650 receives incoming television signals from an external source, such as a set-top box of a cable television service provider (Cable Co.) or the phone company, a local antenna, the Internet, an attached DVD or VHS tape player, or the like, and transmits a viewer-selected channel to television set 605.

According to an advantageous embodiment digital video recorder system 650 is capable of playing back recorded program streams. In RECORD mode, digital video recorder system 650 may demodulate an incoming radio frequency (RF) television signal to produce a baseband video signal that is recorded and stored on a storage medium within or connected to video playback device 650. In PLAY mode, digital video recorder system 650 retrieves a stored baseband video signal (i.e., program) selected by the user from the storage medium and transmits the retrieved program to television 605.

According to an exemplary embodiment of the present invention, digital video recorder (DVR) system 650 is a disk drive-based device, such as a ReplayTV™ recorder or a TiVO™ recorder, DVR system 650 stores and retrieves the incoming television signals to and from a computer magnetic hard disk rather than a magnetic cassette tape. In still other embodiments, video playback device 650 may store and retrieve from a local read/write (R/W) digital versatile disk (DVD) or R/W CD-ROM. Thus, the local storage medium may be fixed (e.g., hard disk drive) or removable (e.g., DVD, CD-ROM). According to these embodiments, digital video recorder system 650 operates to multiplex received packetized elementary streams into a multiplexed program stream for later playback. The packetized elementary streams comprise many PES packets of disparate size. Digital video recorder system 650 operates to (i) receive the PES packets, (ii) reformat each received PES packet into at least one fixed-size program packet having a header and a payload, and (iii) associate and store ones of the fixed-size program packets into the multiplexed program stream to the storage medium.

Digital video recorder system 650 comprises infrared (IR) sensor 660 that receives commands (such as Channel Up, Channel Down, Volume Up, Volume Down, Record, Play, Fast Forward (FF), Reverse, Fast Reverse, Slow Reverse, and the like) from a remote control device operated by the viewer. Television 605 is a conventional television comprising screen 610, infrared (IR) sensor 615, and one or more manual controls 620 (indicated by a dotted line). IR sensor 615 also receives commands (such as volume up, volume down, power ON/OFF) from a remote control device operated by the viewer.

It should be noted that DVR system 650 is not limited to receiving a particular type of incoming television signal from a particular type of source. As noted above, the external source may be a cable service provider, a conventional RF broadcast antenna, a satellite dish, an Internet connection, or another local storage device, such as a DVD player. Thus, the incoming signal may be a conventional digital signal, such as MPEG-2, an conventional NTSC analog signal, or digital Internet protocol (IP) packets of any other communication protocol. However, for the purposes of simplicity and clarity in explaining the principles of the present invention, the descriptions that follow shall generally be directed to an embodiment in which DVR system 650 receives incoming television signals (analog and/or digital) from a cable service provider. Nonetheless, those skilled in the art will understand that the principles of the present invention may readily be adapted for use with wireless broadcast television signals, local storage systems, an incoming stream of IP packets containing MPEG data, and the like.

Figure 7:
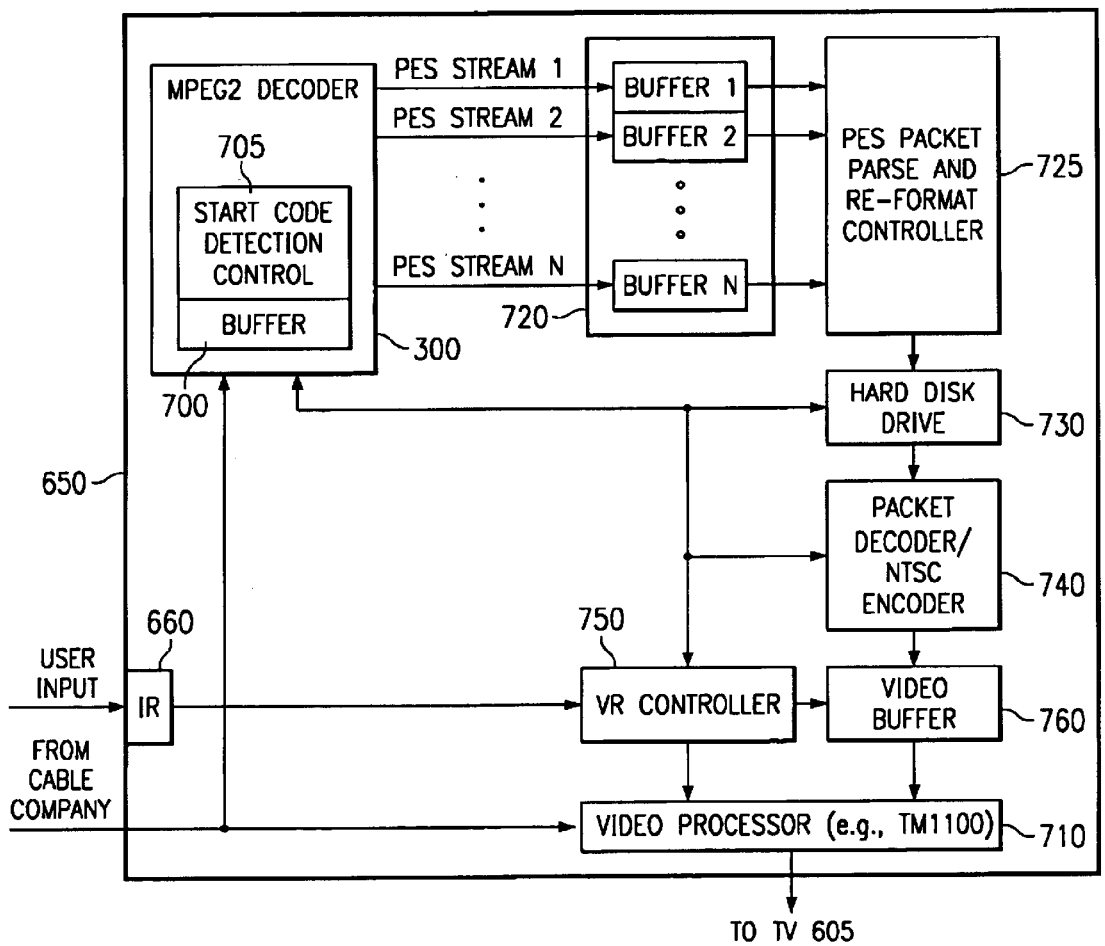
FIG. 7 illustrates the exemplary digital video recorder (DVR) system in greater detail according to one embodiment of the present invention.

FIG. 7 illustrates exemplary digital video recorder (DVR) system 650 in greater detail according to one embodiment of the present invention. DVR system 650 comprises IR sensor 660, video processor 710, MPEG-2 Decoder 300, buffers 720, PES Packet Parse and Re-Format Controller 725, hard disk drive 730, Program Packet Decoder/NTSC encoder 740. DVR system 650 further comprises video buffer 760 and video recorder (VR) controller 750.

VR controller 750 directs the overall operation of DVR system 650, including View mode, Record mode, Play mode, Fast Forward (FF) mode, Reverse (Normal, Fast, Slow) mode, Pause mode, and Skip mode, among others. In View mode, VR controller 750 causes the incoming television signal from the exemplary cable service provider to be demodulated and processed by video processor 710 and transmitted to television 605, without storing or retrieving from hard disk drive 730.

The internal circuitry of DVR system 650 varies depending on whether the external broadcast signal received by DVR system 650 is digital, such as MPEG-2, or analog, such as NTSC. For example, if the external broadcast signal received from the cable service provider is an analog signal, video processor 710 may be, for example, a TriMedia (™) 6100 media processor, which contains radio frequency (RF) front-end circuitry for receiving incoming analog television signals, tuning to a user-selected channel, and converting the selected RF signal to a baseband television signal (e.g., super video signal) suitable for display on television 605.

Exemplary MPEG-2 Decoder 300 operates to decode received bitstreams for processing in DVR system 650 to generate program streams for temporary storage and later playback. MPEG-2 Decoder 300 provides an efficient means by which to detect embedded start codes within the bitstreams received in DVR system 650. MPEG-2 Decoder 300 illustratively includes a memory buffer 700 and a Start Code Detection Controller 705. Exemplary buffer 700 is operable to temporarily store bitstreams received in DVR system 650.

Exemplary controller 705 is operable to (i) sequentially fetch thirty-two bit words of a received bitstream from memory buffer 700, (ii) determine whether a start code prefix and a start code value are properly aligned within any such fetched thirty-two bit word, and (iii) determine, if not properly aligned within the thirty-two bit word, whether the least significant byte of any such thirty-two bit word may be part of the start code prefix. An important aspect of this embodiment is that the processing resources of MPEG-2 Decoder 300 (and, by implication, DVR system 650) used in attempting to detect embedded start codes in received bit streams are minimized. Again, this is desirable because start codes are relatively infrequently received.

If it is determined that the start code is not part of the thirty-two bit word under consideration (i.e., if the least significant byte is not part of the start code prefix), then controller 705 is operable to fetch another thirty-two bit word of the buffered bitstream.

If it is determined that the start code may be part of the thirty-two bit word under consideration, then controller 705 is further operable to determine whether the start code prefix is misaligned, either within the thirty-two bit word under consideration, or across the thirty-two bit word under consideration and a next thirty-two bit word (as will be discussed in greater detail with respect to FIG. 8).

In RECORD mode, VR controller 750 causes the incoming television signal to be stored on hard disk drive 730 in the form of a multiplexed program signal of fixed-sized program packets. According to one embodiment of the present invention, DVR system 650 receives packetized elementary streams from MPEG-2 Decoder 300 into memory buffer 740, the elementary streams comprising PES packets of varying sizes. Exemplary controller 725 reformats each of the buffered PES packets into at least one fixed-size program packet, and associates ones of the fixed-size program packets into the multiplexed program stream and stores the same in hard disk drive 730.

In one embodiment, an MPEG-2 encoder (not shown) may optionally be provided if the external broadcast signal is an analog signal. For example, under the control of VR controller 750, the MPEG-2 encoder may receive an incoming NTSC-type analog television signal and convert the received broadcast signal to MPEG-2 format for storage on hard disk drive 730 in accord with the principles of the present invention. Alternatively, if the external broadcast signal is already a digital signal, such as MPEG-2, then the MPEG-2 encoder may be omitted.

In PLAY mode, VR controller 750 directs hard disk drive 730 to stream the stored multiplexed program signal (i.e., program) to Program Packet Decoder/NTSC encoder 740, which converts the program packets from hard disk drive 730 to, for example, a super video (S-Video) signal that is buffered in video buffer 760 before video processor 710 transmits it to television 605.

For the purposes of this application and the claims that follow, hard disk drive 730 is defined broadly as a "storage disk," and includes any mass storage device that is both readable and writable, including conventional magnetic disk drives, and optical disk drives for read/write digital versatile disks (DVD-RW), re-writable CD-ROMs, and the like. In fact, hard disk drive 730 need not be fixed in the conventional sense that is permanently embedded in DVR system 650. Rather, hard disk drive 730 includes any mass storage device that is dedicated to DVR system 650 for the purpose of storing recorded television programs. Thus, hard disk drive 730 may include an attached peripheral drive or removable disk drives (whether embedded or attached), such as a juke box device that holds read/write DVDs or re-writable CD-ROMs. Furthermore, in an advantageous embodiment of the present invention, hard disk drive 730 may include external mass storage devices that DVR system 650 may access and control via a network connection (e.g., Internet protocol (IP) connection), including, for example, a disk drive in a home personal computer (PC) or a disk drive on a server at an Internet service provider (ISP).

FIG. 8 illustrates a flow diagram of an exemplary method (generally designated 800) of detecting start codes in bitstreams received and buffered in MPEG-2 Decoder 300 according to one embodiment of the present invention. For purposes of illustration only, concurrent reference is made to the discussion of FIGS. 6 and 7 above, and it is assumed that DVR system 650 will operate in RECORD mode. To that end, those skilled in the art will readily recognize that the principles of the present invention may be embodied in any suitably arranged controller associated with a MPEG decoder requiring the detection of start codes associated with received bitstreams.

To begin, DVR system 650 is directed to enter into RECORD mode, and receives MPEG data streams at MPEG Decoder 300 (process step 805). The received bitstreams are temporarily buffered in memory buffer 700. Controller 705 sequentially fetches thirty-two bit words of the buffered bitstreams from memory buffer 700 (process step 810).

For each thirty-two bit word, controller 705 determines whether a start code is embedded therein—attempting to detect start code prefixes. Controller 705 determines whether a start code prefix and a start code value are properly aligned within any such fetched thirty-two bit word (process step 815). This determination step may suitably be a simple check to determine whether the three most significant bytes of the thirty-two bit word equals "00 00 01 xx" (although alternate implementations may suitably be used, as is discussed hereafter).

If a determination is made that the thirty-two bit word includes an aligned start code, then controller 700 informs Decoder 300 (process step 829), which in turn takes the steps necessary to properly process the detected start code as is well-known in the art.

If a start code is not properly aligned within the thirty-two bit word (the occurrence of an aligned start code is relatively rare; "N" branch of step 815), then controller 705 determines whether the least significant byte of the thirty-two bit word may be part of the start code prefix (process step 820). This is an important aspect of this embodiment of the invention, as the processing resources of MPEG-2 Decoder 300 (and, by implication, DVR system 650) used in attempting to detect embedded start codes in received bit streams are minimized. Again, this is desirable because start codes are relatively infrequently received.

This determination terminates the detection process if the least significant byte of the thirty-two bit word does not equal either "01" or "00," respectively indicating that a misaligned start code may be wholly within the thirty-two bit word or span the thirty-two bit word and a "next" thirty-two bit word.

If it is determined that the start code is not part of the thirty-two bit word under consideration ("N" branch of process step 820; i.e., if the least significant byte is not part of the start code prefix, the occurrence of a misaligned start code is relatively rare), then controller 705 is operable to fetch another thirty-two bit word of the buffered bitstream (return to process step 810).

If it is determined that the start code may be part of the thirty-two bit word under consideration ("Y" branch of process step 820), then controller 705 is further operable to determine (i.e., seek confirmation) whether the start code prefix is misaligned, either within the thirty-two bit word under consideration, or across the thirty-two bit word under consideration and a next thirty-two bit word (process step 825). Again, if it is determined that the thirty-two bit word, or in combination with the "next" thirty-two bit word, includes an misaligned start code, then controller 700 informs Decoder 300 (process step 829), which again takes the steps necessary to properly process the detected start code as is well-known in the art.

As the parsing of each thirty-two bit word for detection of start codes completes, MPEG Decoder 300 more generally operates to decode a plurality of packetized elementary streams 400 into memory buffer 740 for temporary storage (process step 830). The exemplary elementary streams are comprised of PES packets of varying sizes. For further understanding of the RECORD mode and details concerning multiplexing packetized elementary streams in accord with the principles hereof, attention is directed to the disclosure of U.S. Ser. No. 09/943,837, filed concurrently herewith, entitled "SYSTEM FOR MULTIPLEXING VIDEO DATA STREAMS IN A DIGITAL VIDEO RECORDER AND METHOD OF OPERATING THE SAME," which is incorporated by reference for all purposes as if fully set forth herein.

For purposes of further illustration, one advantageous implementation of the illustrated embodiment set forth and discussed herein is embodied in the following algorithm:

(i) fetch a thirty-two bit word of a received bitstream (process step 810);

(ii) determine whether a start code prefix and a start code value are properly aligned within the thirty-two bit word (process step 815; a first test);

(iii) if not properly aligned within the thirty-two bit word, determine whether the least significant byte of the thirty-two bit word may be part of the start code prefix (process step 820; second test, i.e., that byte is "00" or "01" requiring then that all bits except bit "0" be "0");

(A) if the least significant byte of the thirty-two bit word may NOT be part of the start code prefix (process step 820), then fetch another thirty-two bit word of the received bitstream (return to process step 810);

(B) otherwise (i.e., the least significant byte of the thirty-two bit word may be part of the start code prefix), then (1) determine whether the start code prefix is misaligned within the thirty-two bit word (process step 825; third test, e.g., check if the thirty-two bit word is "xx 00 00 01");

(2) if not, determine whether a part of the start code prefix is misaligned within the most significant byte of the "next" thirty-two bit word (process step 825; fourth test, e.g., if so, most significant byte of the "next" thirty-two bit word is "00" or "01", test that all bits except bit "0" are "0");

(3) if not, determine whether a part of the start code prefix is misaligned in part within the thirty-two bit word and in part within the "next" thirty-two bit word (process step 825; fifth and sixth tests, e.g., the thirty-two bit word is "xx xx 00 00" and the "next" thirty-two bit word is "01 xx xx xx"); and (4) if not, determine whether a part of the start code prefix is misaligned in part within the thirty-two bit word and in part within the "next" thirty-two bit word (process step 825; seventh and eighth tests, e.g., the thirty-two bit word is "xx xx xx 00" and the "next" thirty-two bit word is "00 01 xx xx").

As is evident from the exemplary algorithm, a "worst" case analysis involves eight process tests to one thirty-two bit word, but in most cases, because start codes are relatively rare, the thirty-two bit word does not have a start code and will fail the second test. Therefore, there is a high incidence of two-step test failures to process one thirty-two bit word, which is significantly improved over the PRIOR ART algorithm wherein six process step tests were required to process each thirty-two bit word. An exemplary implementation in "C" is attached as APPENDIX "A".

For purposes of yet further illustration, another advantageous implementation of the illustrated embodiment is embodied in the following algorithm:

(i) fetch a thirty-two bit word of a received bitstream (process step 810);

(ii) determine whether a start code prefix and a start code value may possibly be either properly aligned within the thirty-two bit word or possibly misaligned at least part of which is within the thirty-two bit word, all by evaluating the most significant byte and the least significant byte of the thirty-two bit word (process steps 815 and 820; a first test, e.g., which may suitably be performed by "AND"ing the thirty-two bit word with the word "FF0000FE");

(iii) if not, the thirty-two bit word is NOT part of the start code prefix (process step 820), then fetch another thirty-two bit word of the received bitstream (return to process step 810);

(iv) otherwise, determine whether the start code prefix is aligned (second test, e.g., check if the thirty-two bit word is "00 00 01 xx") or misaligned (third test, e.g., check if the thirty-two bit word is "xx 00 00 01") within the thirty-two bit word;

(v) if not, determine whether a part of the start code prefix is misaligned within the most significant byte of the "next" thirty-two bit word (fourth test);

(vi) if not, determine whether a part of the start code prefix is misaligned in part within the thirty-two bit word and in part within the "next" thirty-two bit word (fifth and sixth tests); and (vii) if not, determine whether a part of the start code prefix is misaligned in part within the thirty-two bit word and in part within the "next" thirty-two bit word (seventh and eighth tests).

As is evident from this second exemplary algorithm, which may be more efficient than the prior algorithm, a "worst" case analysis involves eight process tests to one thirty-two bit word, but in most cases, because start codes are again relatively rare, the thirty-two bit word does not have a start code and will fail the first test. Therefore, there is a high incidence of one-step test failures to process one thirty-two bit word, which is significantly improved over the PRIOR ART algorithm wherein six process step tests were again required to process each thirty-two bit word. An exemplary implementation in "C" is attached as APPENDIX "B".

Although the present invention has been described in detail, those skilled in the art should understand that they can make various changes, substitutions and alterations herein without departing from the spirit and scope of the invention in its broadest form.

ATTY. DOCKET NO. 01-S-019  PATENT

Appendix "A"

```
Inline SCD_ERROR_t PatentFindNextStartCode(U32* StartAddress, U32* EndAddress, U8** StartCodeAddress)
{

U32 Word1, Word2;
   SCD_ERROR_t Error;

Error = SCD_ERROR_NO_START_CODE;
   Word1 = *StartAddress;
   while(StartAddress<EndAddress)
   {

/* start code */
      if ((Word1 & 0x00ffffff) == 0x00010000)
      {

*StartCodeAddress = (U8*)StartAddress;
         Error = SCD_ERROR_START_CODE_FOUND;
         break;
      }
      else
      {

/* looking for a prefix */
         if ((Word1 & 0xfe000000) == 0)
         {

/* start code */
            if((Word1 & 0xffffff00) == 0x01000000)
            {
```

ATTY. DOCKET NO. 01-S-019                                                           PATENT

```
 1        *StartCodeAddress = ((U8*)StartAddress)+1;
 2        Error = SCD_ERROR_START_CODE_FOUND;
 3        break;
 4     }
 5     /* potential prefix */
 6     StartAddress++;
 7     Word2 = *StartAddress;
 8     if ((Word2 & 0x000000fe) == 0)
 9     {
10
11        /* potential suffix */
12        if (((Word1 & 0xFFFF0000) == 0x00000000) && ((Word2 & 0x000000ff) == 0x01))
13        {
14
15            *StartCodeAddress = ((U8*)StartAddress)-2;
16            Error = SCD_ERROR_START_CODE_FOUND;
17            break;
18        }
19        else
20        {
21
22            if (((Word1 & 0xFF000000) == 0x00000000) && ((Word2 & 0x0000ffff) == 0x0100))
23            {
24
25                *StartCodeAddress = ((U8*)StartAddress)-1;
26                Error = SCD_ERROR_START_CODE_FOUND;
27                break;
28            }
29            else
30            { /* no start code :word2 has to be treated as a new word */
31                Word1 = Word2;
```

ATTY. DOCKET NO. 01-S-019                                    PATENT

```
1                  }
2                }
3              }
4           else
5           { /* no suffix :word2 has to be treated as a new word */
6               Word1 = Word2;
7           }
8         }
9         else
10        { /* no prefix : fetch a new word */
11            StartAddress++;
12            Word1 = *StartAddress;
13        }
14      }
15    }
16    return (Error);
17  }
```

ATTY. DOCKET NO. 01-S-019                                              PATENT

Appendix "B"

```
1                               APPENDIX "B"
2    Inline SCD_ERROR_t PatentFindNextStartCode(U32* StartAddress, U32* EndAddress, U8** StartCodeAddress)
3    {
4
5        U32 Word1, Word2;
6        SCD_ERROR_t Error;
7
8        Error = SCD_ERROR_NO_START_CODE;
9        Word1 = *StartAddress;
10       while(StartAddress<EndAddress)
11       {
12
13           /* start code */
14           if ((Word1 & 0xfffffffe) == 0x00000000)
15           {
16
17               /* start code */
18               if ((Word1 & 0x00ffffff) == 0x00010000)
19               {
20
21                   *StartCodeAddress = (U8*)StartAddress;
22                   Error = SCD_ERROR_START_CODE_FOUND;
23                   break;
24               }
25               /* start code */
26               if((Word1 & 0xffffff00) == 0x01000000)
27               {
28
29                   *StartCodeAddress = ((U8*)StartAddress)+1;
30                   Error = SCD_ERROR_START_CODE_FOUND;
```

ATTY. DOCKET NO. 01-S-019                                          PATENT

```
1            break;
2        }
3        /* potential prefix */
4        StartAddress++;
5        Word2 = *StartAddress;
6        if ((Word2 & 0x000000fe) == 0)
7        {
8
9            /* potential suffix */
10           if (((Word1 & 0xFFFF0000) == 0x00000000) && ((Word2 & 0x000000ff) == 0x01))
11           {
12
13               *StartCodeAddress = ((U8*)StartAddress)-2;
14               Error = SCD_ERROR_START_CODE_FOUND;
15               break;
16           }
17           else
18           {
19
20               if (((Word1 & 0xFF000000) == 0x00000000) && ((Word2 & 0x0000ffff) == 0x0100))
21               {
22
23                   *StartCodeAddress = ((U8*)StartAddress)-1;
24                   Error = SCD_ERROR_START_CODE_FOUND;
25                   break;
26               }
27               else
28               { /* no start code ;word2 has to be treated as a new word */
29                   Word1 = Word2;
30               }
31           }
```

ATTY. DOCKET NO. 01-S-019                                          PATENT

```
1           }
2            else
3             { /* no suffix :word2 has to be treated as a new word */
4                Word1 = Word2;
5             }
6           }
7            else
8             { /* no prefix : fetch a new word */
9                StartAddress++;
10               Word1 = *StartAddress;
11            }
12         }
13       }
14     return (Error);
15   }
```

What is claimed is:

1. A MPEG decoder, comprising:
a controller capable of detecting start codes in bitstreams received in said MPEG decoder, each of said start codes having a three-byte start code prefix and a one-byte start code value, said controller operable to:
fetch a thirty-two bit word of a received bitstream,
determine whether a start code prefix and a start code value are properly aligned within said thirty-two bit word, and
if not properly aligned within said thirty-two bit word, determine that the thirty-two bit word does not contain any portion of the start code prefix based solely on a determination that a least significant byte of said thirty-two bit word is not part of said start code prefix.

2. The MPEG decoder as set forth in claim 1 wherein said controller is further operable, if the least significant byte is not part of said start code prefix, to fetch another thirty-two bit word of said received bitstream.

3. The MPEG decoder as set forth in claim 1 wherein said controller is further operable to determine whether said start code prefix is within the three least significant bytes of said thirty-two bit word.

4. The MPEG decoder as set forth in claim 1 wherein said controller is further operable to determine whether part of said start code prefix may be within the most significant byte of a next thirty-two bit word.

5. The MPEG decoder as set forth in claim 4 wherein said controller is further operable to fetch said next thirty-two bit word of said received bitstream.

6. The MPEG decoder as set forth in claim 4 wherein said controller is further operable to determine whether part of said start code prefix is within the two least significant bytes of said thirty-two bit word and the most significant byte of said next thirty-two bit word.

7. The MPEG decoder as set forth in claim 4 wherein said controller is further operable to determine whether part of said start code prefix is within the least significant byte of said thirty-two bit word and the two most significant bytes of said next thirty-two bit word.

8. A digital video recorder capable of playing back a recorded program stream, said digital video recorder comprising:
a video processor capable of receiving an incoming program stream and converting said incoming program stream to a baseband signal capable of being displayed on a television associated with said digital video recorder;
a storage disk capable of storing program streams for time-shifted viewing; and
a MPEG decoder capable of decoding received bitstreams and generating PES packets, said MPEG decoder comprising a controller capable of detecting start codes in said received bitstreams, each of said start codes having a three-byte start code prefix and a one-byte start code value, said controller operable to:
fetch a thirty-two bit word of a received bitstream,
determine whether a start code prefix and a start code value are properly aligned within said thirty-two bit word, and
if not properly aligned within said thirty-two bit word, determine that the thirty-two bit word does not contain any portion of the start code prefix based solely on a determination that a least significant byte of said thirty-two bit word is not part of said start code prefix.

9. The digital video recorder as set forth in claim 8 wherein said controller is further operable, if the least significant byte is not part of said start code prefix, to fetch another thirty-two bit word of said received bitstream.

10. The digital video recorder as set forth in claim 8 wherein said controller is further operable to determine whether said start code prefix is within the three least significant bytes of said thirty-two bit word.

11. The digital video recorder as set forth in claim 8 wherein said controller is further operable to determine whether part of said start code prefix may be within the most significant byte of a next thirty-two bit word.

12. The digital video recorder as set forth in claim 11 wherein said controller is further operable to fetch said next thirty-two bit word of said received bitstream.

13. The digital video recorder as set forth in claim 11 wherein said controller is further operable to determine whether part of said start code prefix is within the two least significant bytes of said thirty-two bit word and the most significant byte of said next thirty-two bit word.

14. The digital video recorder as set forth in claim 11 wherein said controller is further operable to determine whether part of said start code prefix is within the least significant byte of said thirty-two bit word and the two most significant bytes of said next thirty-two bit word.

15. A method of detecting start codes in bitstreams received in a MPEG decoder, each of said start codes having a three-byte start code prefix and a one-byte start code value, said method comprising the steps of:
fetching a thirty-two bit word of a received bitstream;
determining whether a start code prefix and a start code value are properly aligned within said thirty-two bit word; and
if not properly aligned within said thirty-two bit word, determining that the thirty-two bit word does not contain any portion of the start code prefix based solely on a determination that a least significant byte of said thirty-two bit word is not part of said start code prefix.

16. The method as set forth in claim 15 further comprising the step of determining whether said start code prefix is within the three least significant bytes of said thirty-two bit word.

17. The method as set forth in claim 15 further comprising the step of determining whether part of said start code prefix may be within the most significant byte of a next thirty-two bit word.

18. The method as set forth in claim 17 further comprising the step of fetching said next thirty-two bit word of said received bitstream.

19. The method as set forth in claim 15 further comprising the step of determining whether part of said start code prefix is within the two least significant bytes of said thirty-two bit word and the most significant byte of a next thirty-two bit word.

20. The method as set forth in claim 15 further comprising the step of determining whether part of said start code prefix is within the least significant byte of said thirty-two bit word and the two most significant bytes of a next thirty-two bit word.

* * * * *